J. C. McINTYRE.
Machine for Preparing Wood Fiber for Paper Pulp.
No. 203,928. Patented May 21, 1878.
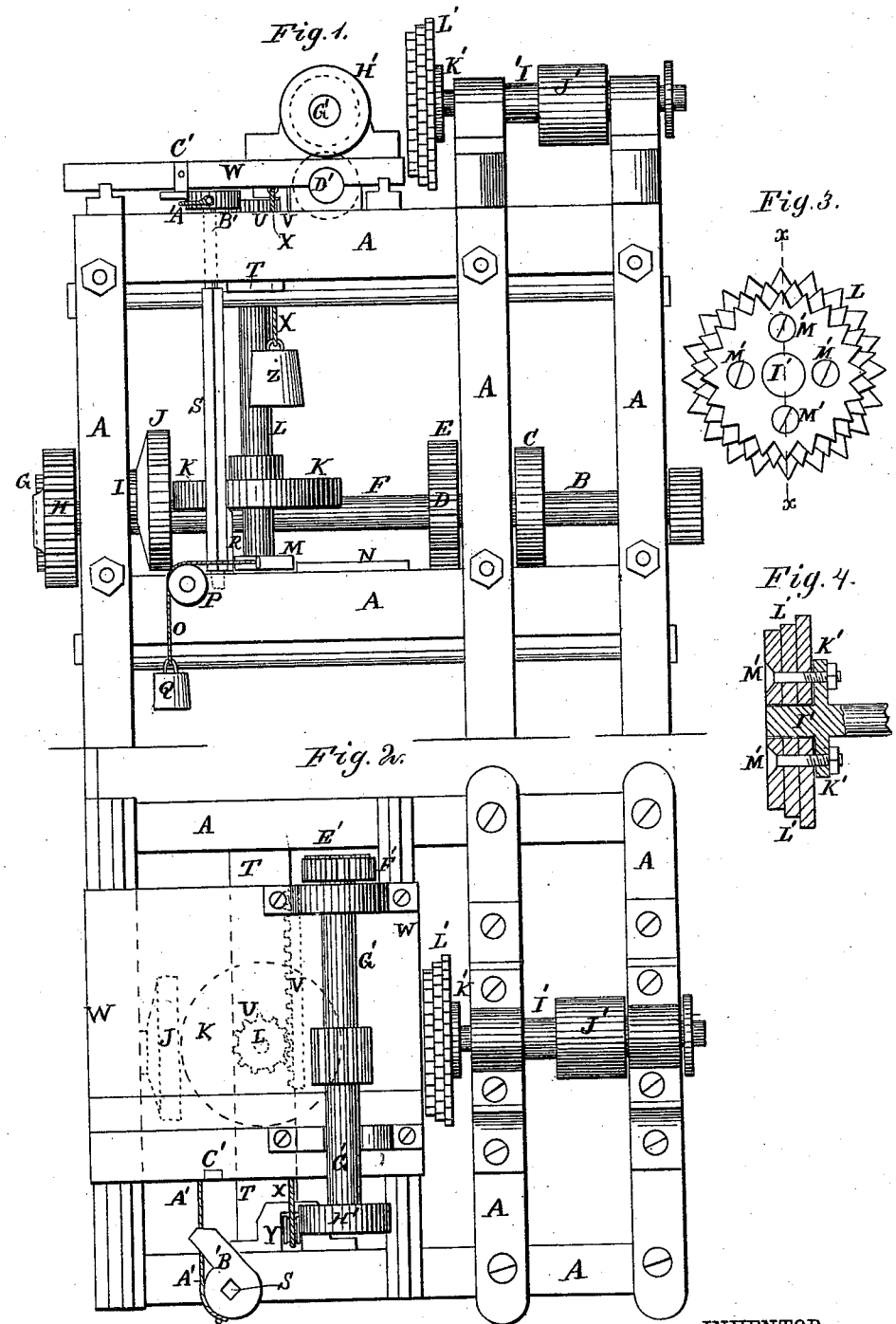

UNITED STATES PATENT OFFICE.

JAMES C. McINTYRE, OF FORT EDWARD, NEW YORK.

IMPROVEMENT IN MACHINES FOR PREPARING WOOD FIBER FOR PAPER-PULP.

Specification forming part of Letters Patent No. 203,928, dated May 21, 1878; application filed April 6, 1878.

*To all whom it may concern:*

Be it known that I, JAMES C. MCINTYRE, of Fort Edward, in the county of Washington and State of New York, have invented a new and useful Improvement in Machine for Preparing Wood Fiber for Paper-Pulp, of which the following is a specification:

Figure 1 is a front view of my improved machine. Fig. 2 is a top view of the same. Fig. 3 is a detail view of the saws. Fig. 4 is a cross-section of the saws, taken through the line $x\ x$, Fig. 3.

Similar letters of reference indicate corresponding parts.

The object of this invention is to furnish an improved machine for preparing wood fiber for paper-pulp, which shall be so constructed as to prevent the formation of long and large fibers or splinters, and so as to enable timber of any desired or convenient size or thickness to be operated upon, and which will feed the timber against the saws automatically, and will bring the feed-table forward automatically when one cut has been completed, bringing it into proper position to enable the timber to be fed forward for another cut.

A represents the frame of the machine, in the lower part of which revolves a shaft, B, provided with a pulley, C, to receive the driving-belt. To the end of the shaft B is attached a small gear-wheel, D, the teeth of which mesh into the teeth of a larger gear-wheel, E, attached to the shaft F. The shaft F revolves in bearings in the lower part of the frame A, and to its other end is attached a small gear-wheel, G, the teeth of which mesh into the teeth of a larger gear-wheel, H, attached to the outer end of the shaft I. The shaft I revolves in bearings attached to the frame A, and to its inner end is attached a friction-wheel, J, against the side of which rests the face of the friction-wheel K, attached to the vertical shaft L. The lower end of the shaft L revolves in a bearing in the bar M, which rests upon the lower side timbers of the frame A, and one end of which is pivoted to one of the said side timbers, so that by moving the free end of the bar M inward the friction-wheel K may be withdrawn from the friction-wheel J and the motion of the feed stopped. The inward movement of the free end of the bar M is limited by a stop, N, attached to the bar of the frame A, upon which the said bar M rests.

To the free end of the bar M is attached the end of a cord, O, which passes over a pulley, P, pivoted to the frame A, and to its other end is attached a weight, Q, of sufficient size to draw the bar M outward and bring the wheel K in contact with the wheel J when left free. The free end of the bar M is moved inward by an eccentric block, R, attached to or formed upon the vertical shaft S, which works in bearings attached to the frame A.

The upper part of the shaft L revolves in bearings in a bar, T, attached to the frame A; and to the upper end of the said shaft is attached a gear-wheel, U, the teeth of which mesh into the teeth of a rack-bar, V, attached to the under side of the feed-table W. The feed-table W slides in ways upon the top of the frame A, and to it is attached the end of a cord, X, which passes over a guide-pulley, Y, pivoted to the frame A, and to its other end is attached a weight, Z, of sufficient size to draw the feed-table W forward when released from the driving mechanism. To the under side of the feed-table W is attached the end of a cord, A′, the other end of which is attached to a cam, B′, and is made of such a length that when the feed-table W has been drawn forward to the end of its movement the said cord A′ will turn the cam B′, turning the shaft S, bringing the cam-block R against the bar M, and throwing the feed mechanism out of gear. When this happens the weight Z at once draws the feed-table back, bringing the timber into position to be moved forward for another cut. As the feed-table W reaches the end of its backward movement a stop, C′, attached to it strikes the cam B′ and turns it, moving the cam-block R away from the bar M, and allowing the weight Q to move the said bar M outward, throwing the feed mechanism again into gear.

To the under side of the feed-table W are attached bearings, in which revolves a shaft, D′, which has an enlargement formed upon it, projecting through a slot in the said feed-table W, for the timber to rest upon. To the forward end of the shaft D′ is attached a gear-wheel, E′, the teeth of which mesh into the teeth of the gear-wheel F', attached to the forward end of the upper feed-shaft G'. The forward end of the shaft G' revolves in bearings attached to the upper side of the forward end of the table W, and which are so formed that the said shaft G' may revolve within them, and that its rear end may have an up-and-down movement.

Upon the shaft G', directly over the enlargement of the shaft D', is formed an enlargement, to rest upon the timber and hold it in place while being operated upon by the saws.

The enlargement of the shafts D' G' should be provided with spikes, to take hold of the timber and hold it in place. To the rear end of the shaft G' is attached a hand-wheel, H', for convenience in raising it, when desired, to allow the timber to be turned or otherwise adjusted, and to enable it to be readily turned when it is desired to move the timber forward for another cut.

I' is the mandrel, which revolves in bearings attached to the top of the frame A, and to it is attached a pulley, J', to receive the driving-belt in the ordinary way. Upon the mandrel I', near its forward end, is formed, or to it is attached, a flange, K', against which the forward saw L', placed upon the end of the said mandrel, rests.

The saws L', any desired number of which may be used, are graduated in size—that is to say, each succeeding saw is made a little smaller than the preceding one, as shown in Figs. 1, 2, 3, and 4. By this construction the saws will be prevented from tearing off splinters or large fibers, which cannot be properly reduced in forming the pulp.

The saws L' are secured in place upon the mandrel I' by bolts M', which pass through them and through the flange K' of the said mandrel I'. The heads of the bolts M' are countersunk into the outer saw, so that the heads of the bolts, the surface of the outer saw, and the end of the mandrel may all be flush with each other, so as not to interfere with the timber being operated upon by the said saws, however large it may be.

If desired, another set of saws, feed-table, &c., may be connected with the other end of the mandrel I', making a double machine, each part working independently of the other.

Having thus described my invention, what I claim as new, and desire to secure by Letters Patent, is—

In a machine for preparing wood fiber for paper-pulp, the series of saws arranged in the form of a cone, the largest saw cutting next the log, and the series of cuts forming ring-steps, as shown and described, whereby each saw cuts fibers of a length equal to its own thickness, and the fibers are all supported at one end by the solid timber of the log, and whereby the teeth are prevented from tearing off slivers as they leave the log.

JAMES C. McINTYRE.

Witnesses:
JOHN OSGOOD,
LYMAN A. COX.